United States Patent [19]

Taylor et al.

[11] Patent Number: 5,474,258
[45] Date of Patent: Dec. 12, 1995

[54] MOUNTING ARRANGEMENT FOR A GAS TURBINE ENGINE

[75] Inventors: Mike C. Taylor; Carl Hodgkinson; Kenneth W. Wright; Derek Perry, all of Derby, England

[73] Assignee: Rolls-Royce plc, London, England

[21] Appl. No.: 244,252

[22] PCT Filed: Aug. 28, 1992

[86] PCT No.: PCT/GB92/01576

§ 371 Date: May 20, 1994

§ 102(e) Date: May 20, 1994

[87] PCT Pub. No.: WO93/11041

PCT Pub. Date: Jun. 10, 1993

[30] Foreign Application Priority Data

Nov. 25, 1991 [GB] United Kingdom .................. 9125011

[51] Int. Cl.⁶ .................................................. B64D 27/00
[52] U.S. Cl. ............................ 244/54; 248/554; 60/39.31
[58] Field of Search ...................... 244/53 R, 54; 60/39.31; 248/554, 555, 556, 557

[56] References Cited

U.S. PATENT DOCUMENTS 3,561,707  2/1971  Strock ...................................... 248/554
4,044,973  8/1977  Moorehead ............................... 244/54
5,277,382  1/1994  Seelen et al. ............................. 244/54

FOREIGN PATENT DOCUMENTS 2237060  1/1975  France .

*Primary Examiner*—Galen L. Barefoot
*Attorney, Agent, or Firm*—Cushman Darby & Cushman

[57] ABSTRACT

A gas turbine engine 10 is suspended via a casing 15 from a pylon 12 by a front mount 20 and a rear mount 40. The front mount 20 comprises a bracket 22, having a plurality of pins 26, 28 and 30 integral therewith, which is bolted to the underside 11 of the pylon 12. The first pin 26 engages an annular flange 16 around the casing 15 to support the engine 10 in a vertical plane. Any vertical loads act peripherally of the casing 15 through the annular flange 16 to minimise the distortion of the casing 15. The second pin 28 engages with the casing 15 directly to prevent axial and lateral movement of the engine 10 relative to the pylon 12. The third pin 30 is provided as a failsafe. In normal operation the third pin 30 carries no load, however if the first pin 26 should break the third pin 30 then supports the engine 10 in a vertical plane. Any vertical loads then act peripherally of the engine casing 15 through an annular flange 18.

4 Claims, 3 Drawing Sheets

MOUNTING ARRANGEMENT FOR A GAS TURBINE ENGINE

The present invention relates to a mounting arrangement by which a gas turbine engine is attached to an aircraft. In particular it relates to a mounting arrangement suitable for connecting a gas turbine engine to a pylon of an aircraft wing.

According to the present invention a mounting arrangement for a gas turbine engine having a casing provided with an at least one annular flange comprises a support member for attachment to an aircraft structure from which the engine is to be mounted, the support member having a first connection means which engages the at least one annular flange on the engine casing to support the engine in a vertical plane, the vertical loads acting peripherally of the engine casing through the at least one annular flange, second connection means which engages the engine casing directly to prevent axial and lateral movement of the engine relative to the aircraft structure and a third connection means which in normal operation carries no load unless the first connection means fails whereby the third connection means engages with a further annular flange on the engine casing to support the engine in a vertical plane, the vertical loads acting peripherally of the engine casing through the further annular flange, characterised in that the first, second and third connection means are an integral part of the support member and the support member and the connection means are split in a direction parallel to the longitudinal axis of the engine to render them damage tolerant.

Preferably the connection means are pins. The first pin may be located in a number of links attached to the annular flange which disperse the load to a number of points on the annular flange.

The connection means are preferably coated with a wear resistance coating, such as tungsten carbide cobalt, which reduces the amount of wear.

The mounting arrangement is for use on a gas turbine engine which is also provided with a connection means which prevents rotation of the engine relative to the aircraft structure from which the engine is mounted. The aircraft structure from which the engine is mounted is preferably a pylon attached to the main beam of an aircraft wing.

The present invention will now be described with reference to the accompanying drawings in which.

Figure 1:
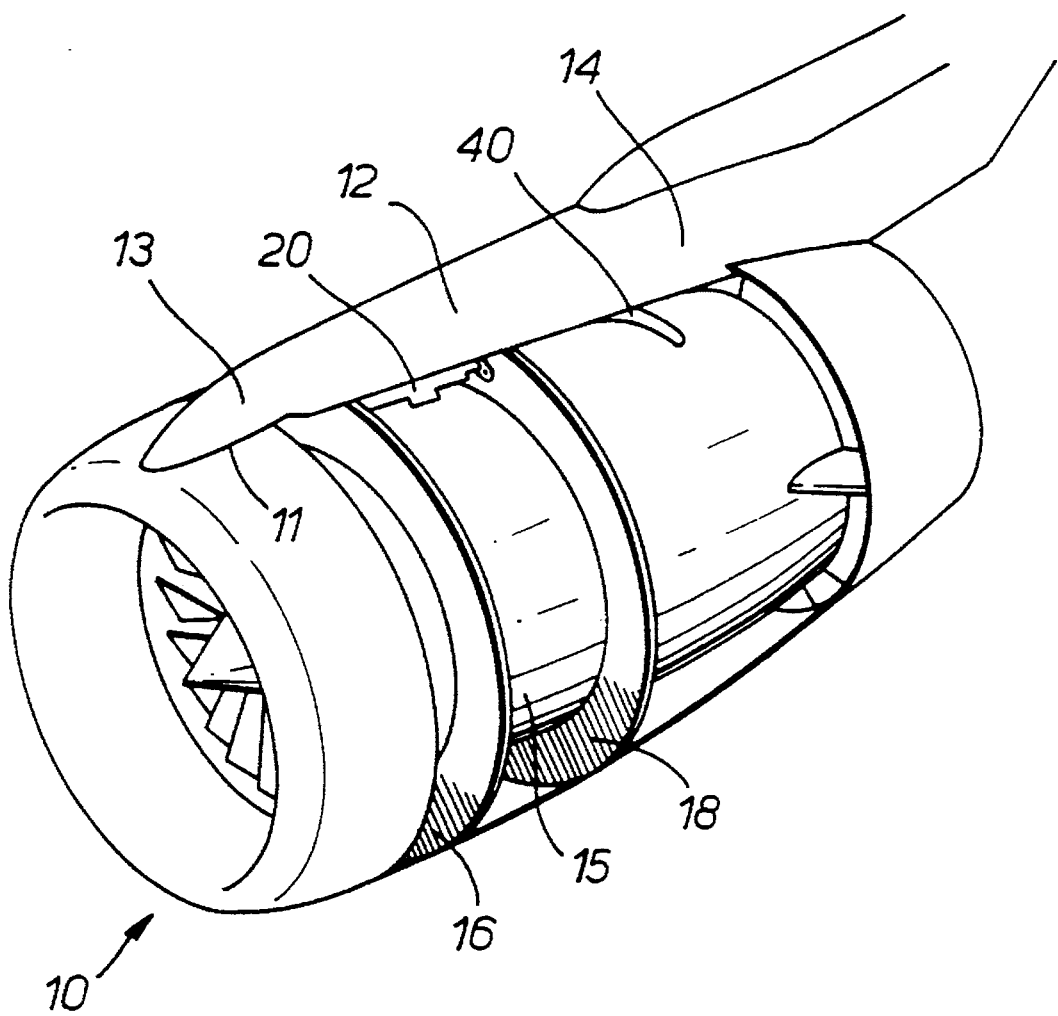
FIG. 1 is a diagrammatic view of a gas turbine engine having a mounting arrangement in accordance with the present invention.

Referring to FIG. 1 a gas turbine engine generally indicated at 10 is secured to an aircraft wing (not shown) via a pylon 12. The gas turbine engine 10 comprises an engine casing 15 which encloses a core engine of generally well known type. The engine casing 15 comprises a number of consecutive sections which are bolted together at annular flagged joints 16 and 18.

The engine 10 is suspended from the pylon 12 in conventional manner wherein the engine casing 15 is secured to the pylon 12 by a front mount 20 and a rear mount 40.

The front mount 20 comprises a bracket 22 which is bolted to the underside 11 of the upstream end 13 of the pylon 12. The bracket 22 is provided with a number of integral pins 26, 28 and 30, shown in FIG. 3, which engage the engine casing 15.

Figure 2:
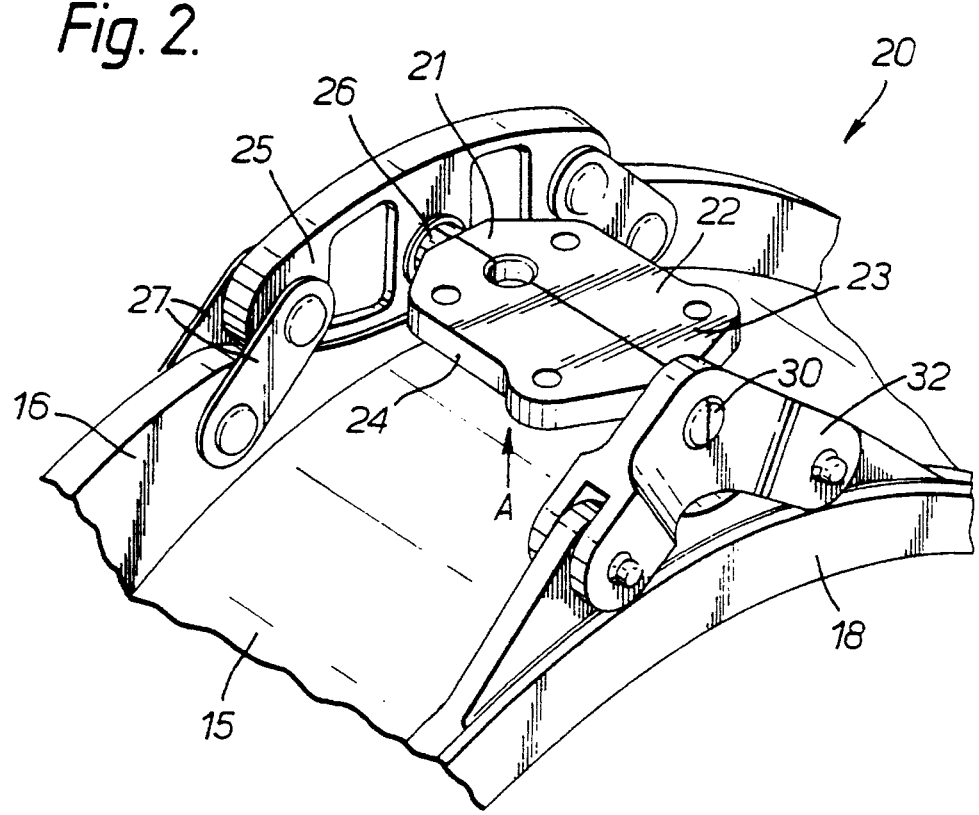
FIG. 2 is an enlarged pictorial view of the front engine mount shown in FIG. 1.

A first pin 26 (FIG. 2) at the upstream end 21 of the bracket 22 engages a link 25 which is attached by plates 27 to the annular flange 16 around the engine casing 15. The first pin 26 supports the engine 15 in the vertical plane and any vertical loads which are generated by the weight of the engine 10 act through the annular flange 16. The vertical loads are not therefore concentrated at specific points on the engine casing 15 but act peripherally thereof. Distortion of the casing 15 is thus substantially minimised.

Figure 4:
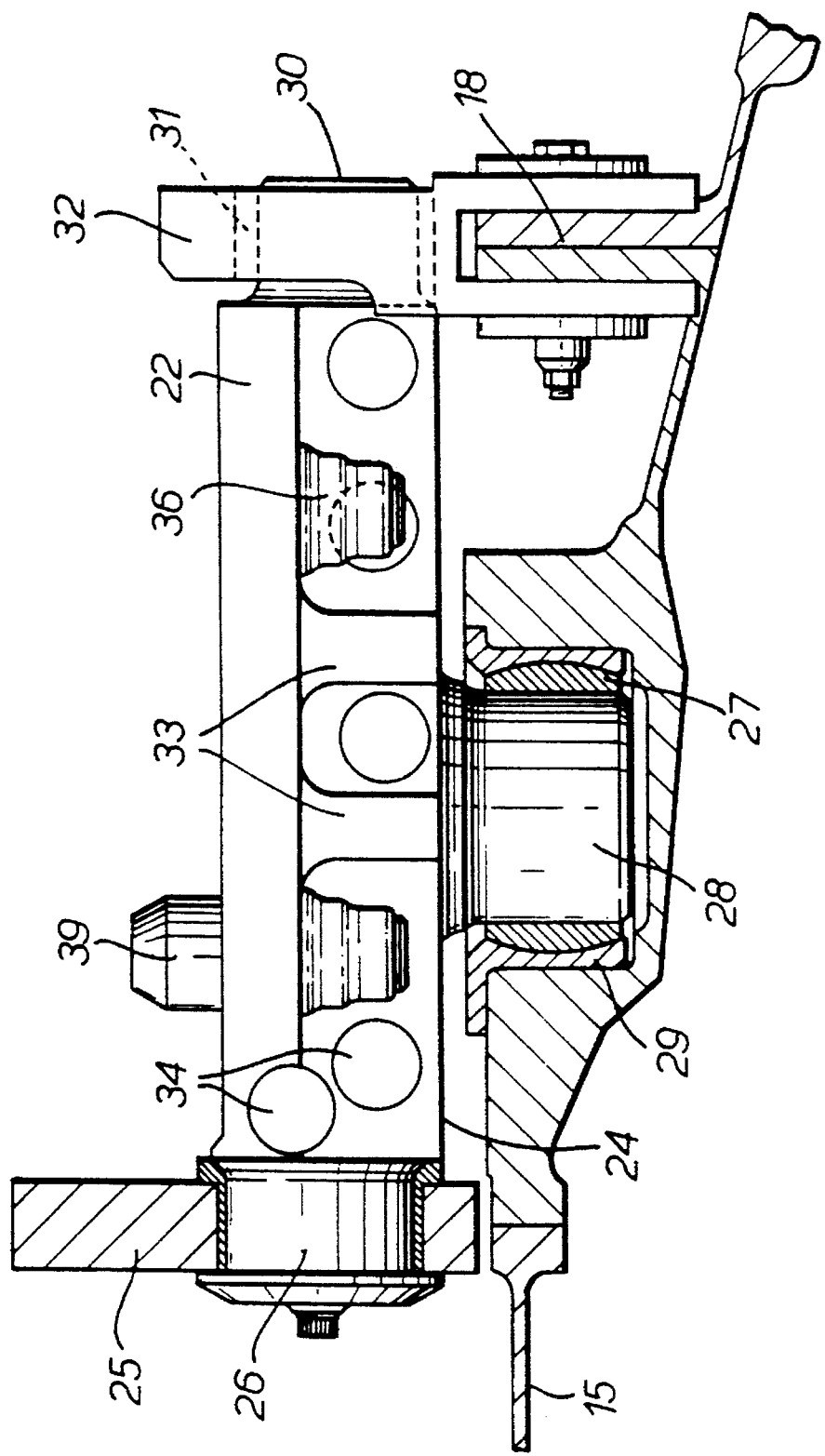
FIG. 4 is a part cross-sectional view of the front engine mount shown in FIG. 3 when viewed in the direction of arrow B.

A second pin 28 on the underside 24 of the bracket 22 engages the engine casing 15 directly (FIG. 4). The second pin 28 is located in a spherical joint 27 which is attached to the engine casing 15 by a bushing 29. The spherical joint allows angular movement of the engine 10 relative to the front engine mount 20.

In operation the thrust of the engine 10 puts an equal and opposite reaction on the engine 10 which if unrestrained would move axially relative to the pylon 12. The second pin 28 acts as a thrust link to prevent this axial movement of the engine 10 relative to the pylon 12. The second pin 28 also prevents lateral movement of the engine 10 from side to side.

A third pin 30 at the downstream end 23 of the bracket 22 is provided as a failsafe feature. In normal operation this third pin 30 carries no load due to a clearance 31 between the third pin 30 and a link 32 which is attached by lugs to the annular flange 18 around the engine casing 15. In the event however that the first pin 26 carrying the vertical loads of the engine 10 should break the weight of the engine 10 is carried by the third pin 30. When the first pin 26 breaks the weight of the engine 10 causes the engine 10 to fall until the third pin 30 comes into contact with the link 32 attached to the annular flange 18. The third pin 30 then supports the engine 10 in a vertical plane. The vertical loads act peripherally of the engine casing 15 through the annular flange 18 to minimise distortion of the engine casing 15.

In the preferred embodiment of the present invention the bracket 22 and pins 26, 28 and 30 are split into two halves in a direction parallel to the longitudinal axis of the engine. The split renders the front mount 20 damage tolerant by preventing cracks propagating from one half of the mount 20 to the other half. The fact that the bracket 22 is split into two halves also assists in assembly of the mount 20. The two halves of the mount 20 are held together by bolts 35, FIG. 3, which are inserted through bolt holes 34 shown in FIGS. 4.

The bracket 22 and pins 26, 28 and 30 are coated with a wear resistant coating, such as tungsten carbide cobalt, which extends the life of the mounting by reducing the amount of wear.

Figure 3:
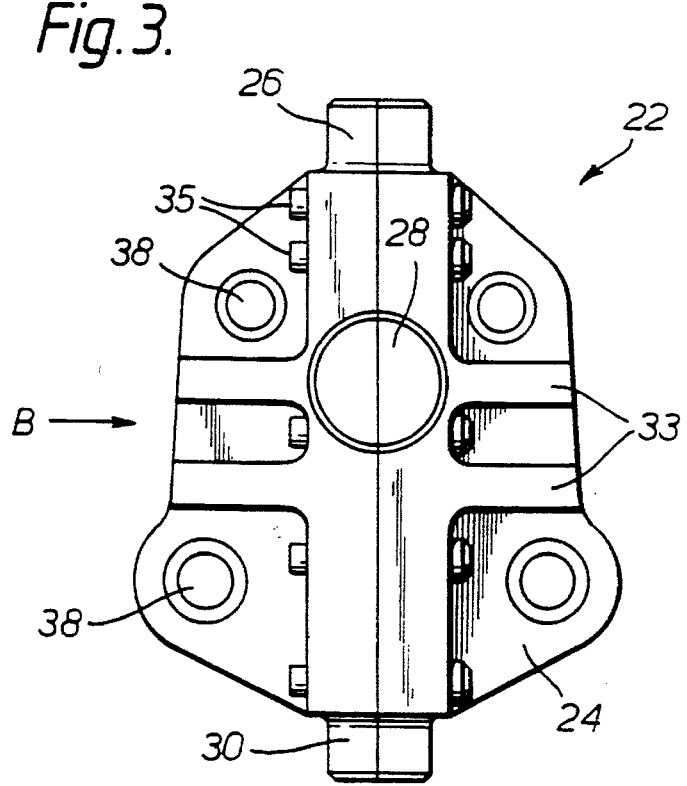
FIG. 3 is a plan view of the front engine mount shown in FIG. 2 when viewed in the direction of arrow A.

The bracket 22 is reinforced by strengthening ribs 33 and is provided with a number of dowel holes 31, FIG. 3, through which dowels 39 (FIG. 4), are inserted. The dowels 39 are inserted to ensure accurate location of the bracket 22 relative to the pylon 12.

The engine 10 is suspended from the downstream portion 14 of the pylon 12 by a conventional rear mount 40. The rear mount 40 connects the engine 10 via the engine casing 15 to the underside 11 of the downstream end 14 of the pylon 12. The rear mount 40 comprises three links which act in conventional manner to restrain any rotational movement of the engine relative to the pylon 12.

We claim:

1. A mounting arrangement for a gas turbine engine (10) having a casing (15) provided with an at least one annular flange (16) comprising a support member (22) for attachment to an aircraft structure (12) from which the engine (10) is to be mounted, the support member (22) having a first connection means (26) which engages the at least one annular flange (16) on the engine casing (15) to support the engine (10) in a vertical plane, the vertical loads acting peripherally of the engine casing (15) through the annular flange (16), a second connection means: (28) which engages the engine casing (15) directly to prevent axial movement of the engine (10) relative to the aircraft structure (12) and a third connection means (30) which in normal operation carries no load unless the first connection means (26) breaks whereby the third connection means (30) engages with a further annular flange (18) on the engine casing (15) to support the engine (10) in a vertical plane, the vertical loads acting peripherally of the engine (15) casing through the further annular flange (18) characterised in that the first (26), second (28) and third (30) connection means are an integral part of the support member (22) and the support member (22) and connection means (26,28 and 30) are split in a direction parallel to the longitudinal axis of the engine (10) to render them damage tolerant.

2. A mounting arrangement as claimed in claim 1 in which the connection means (26, 28 and 38) are pins.

3. A mounting arrangement as claimed in claim 1 in which the first connection means (26) engages a number of links (25 and 27) which are attached to the annular flange (16) on the engine casing (15) and which distribute the vertical loads acting thereon to a number of points on the annular flange (16).

4. A mounting arrangement as claimed in claim 1 in which the connection means (26, 28 and 30) are coated with a wear resistant coating to reduce the amount of wear.

* * * * *